United States Patent
Scott

(10) Patent No.: US 7,558,203 B2
(45) Date of Patent: *Jul. 7, 2009

(54) SYSTEM AND METHOD FOR STATISTICAL CONTROL OF POWER DISSIPATION WITH HOST ENFORCEMENT

(75) Inventor: Bob Scott, Largo, FL (US)

(73) Assignee: Paradyne Corporation, Largo, FL (US)

( * ) Notice: Subject to any disclaimer, the term of this patent is extended or adjusted under 35 U.S.C. 154(b) by 867 days.

This patent is subject to a terminal disclaimer.

(21) Appl. No.: 11/052,317

(22) Filed: Feb. 7, 2005

(65) Prior Publication Data

US 2005/0135247 A1    Jun. 23, 2005

Related U.S. Application Data

(63) Continuation of application No. 09/780,775, filed on Feb. 9, 2001, now Pat. No. 6,856,597.

(60) Provisional application No. 60/181,695, filed on Feb. 10, 2000.

(51) Int. Cl.
  *H04J 1/16* (2006.01)
  *H04J 3/14* (2006.01)
(52) U.S. Cl. .................... 370/234; 370/465
(58) Field of Classification Search ............ 370/229, 370/230, 234, 235
See application file for complete search history.

(56) References Cited

U.S. PATENT DOCUMENTS

| | | | |
|---|---|---|---|
| 4,756,007 A | 7/1988 | Qureshi et al. ............ 375/259 |
| 5,367,523 A | 11/1994 | Chang et al. ............. 370/235 |
| 5,617,409 A * | 4/1997 | Ozveren et al. ............ 370/235 |
| 5,802,310 A | 9/1998 | Rajaraman ............... 709/234 |
| 5,999,563 A * | 12/1999 | Polley et al. ............. 375/222 |
| 6,128,348 A * | 10/2000 | Kao et al. ................ 375/260 |
| 6,282,178 B1 * | 8/2001 | Noerpel et al. ............ 370/316 |
| 6,411,601 B1 * | 6/2002 | Shaffer et al. ............. 370/230 |
| 6,470,003 B1 * | 10/2002 | Smith et al. ............. 370/345 |
| 6,490,271 B1 | 12/2002 | Erjanne ................. 370/347 |
| 6,560,243 B1 | 5/2003 | Mogul .................. 370/468 |
| 6,633,539 B1 | 10/2003 | Basso et al. ............. 370/229 |
| 6,654,344 B1 | 11/2003 | Toporek et al. ........... 370/230 |
| 6,657,954 B1 | 12/2003 | Bird et al. .............. 370/229 |
| 6,856,597 B1 * | 2/2005 | Scott .................... 370/234 |

* cited by examiner

*Primary Examiner*—Seema S Rao
*Assistant Examiner*—Leon Andrews
(74) *Attorney, Agent, or Firm*—Thomas, Kayden, Horstemeyer & Risley, LLP

(57) ABSTRACT

The power budgeter controls the rate of data flow in a transceiver. The power budgeter monitors transceiver activity (data flow) during a predefined period, and limits transceiver data transmit and receive rates during times when the aggregate transceiver activity would otherwise exceed a predefined threshold. If total data flow during the monitored time period exceeds the threshold, data flow through the transceiver during the next (second) time period is limited. Data flow rates are limited in a transceiver by shutting off the transceiver (receiver and/or transmitter) for a specified portion of the second time period. In other types of transceivers, the transmitter and/or receiver may be forced into a low-power idle state or similar operating condition for a specified portion of the second predefined time period.

21 Claims, 6 Drawing Sheets

SYSTEM AND METHOD FOR STATISTICAL CONTROL OF POWER DISSIPATION WITH HOST ENFORCEMENT

CROSS-REFERENCE TO RELATED APPLICATION

This application is a continuation of U.S. utility application entitled, "SYSTEM AND METHOD FOR STATISTICAL CONTROL OF POWER DISSIPATION WITH HOST ENFORCEMENT," having Ser. No. 09/780,775, filed Feb. 9, 2001, now issued U.S. Pat. No. 6,856,597 B1 which is entirely incorporated herein by reference.

This application claims priority to U.S. provisional application entitled, "STATISTICAL CONTROL OF POWER DISSIPATION WITH HOST ENFORCEMENT," having Ser. No. 60/181,695, filed Feb. 10, 2000, which is entirely incorporated herein by reference.

TECHNICAL FIELD

The present invention relates generally to data communications, and more particularly, to a system and method for managing power consumption in a transceiver.

BACKGROUND

With the increasing bandwidth demands from the advent of the Internet, service providers have looked for ways to increase data transmission performance over the copper wire local loop transmission lines that connect telephone central offices (COs) to customer premises (CPs). In conventional telephony networks, customer premises equipment (CPE) are coupled to CO switches over the above mentioned transmission lines, which are commonly known as "local loops," "subscriber lines," "subscriber loops," "loops," or the "last mile" of the telephone network. In the art, the term "line" and "loop" are used interchangeably, both terms referring to the copper wire pair used in a typical telephone transmission line conductor. Historically, the public switched telephone network (PSTN) evolved with subscriber loops coupled to a telephone network with circuit-switched capabilities that were designed to carry analog voice communications. "Central office" or "CO" means any site where a subscriber loop couples to a telephony switching unit, such as a public switched telephone network (PSTN), a private branch exchange (PBX) telephony system, or any other location functionally coupling subscriber loops to a telephony network. Digital service provision to the CP is a more recent development. With it, the telephone network has evolved from a system capable of only carrying analog voice communications into a system that can simultaneously carry voice and digital data.

Because of the prohibitive costs of replacing or supplementing existing subscriber loops, technologies have been implemented that utilize existing subscriber loops to provide easy and low cost migration to digital technologies. Subscriber loops capable of carrying digital signals are known as digital subscriber lines (DSLs). Various digital technologies provide customers with additional flexibility and enhanced services by utilizing frequency-division multiplexing (FDM) and/or echo-canceling (EC) and/or time-division multiplexing (TDM) techniques to fully exploit the transmission capability of a subscriber loop. These newer DSL technologies provide digital service to the customer premises without significantly interfering with the existing plain old telephone service (POTS) equipment and wiring by utilizing portions of the available frequency spectrum not used by a POTS signal. These portions of the frequency spectrum are often referred to as "logical channels." Logical channels within a subscriber line that carry digital signals are known as "DSL channels," while logical channels within a subscriber line which carry POTS analog signals are known as "POTS channels."

DSL technologies, such as but not limited to integrated services digital network (ISDN), high-bit-rate digital subscriber line (HDSL), HDSL2 and symmetric digital subscriber line (SDSL), utilize echo-canceled pulse amplitude modulation to create a baseband data transmission spectrum and therefore do not coexist with a POTS signal which typically utilizes the 0-4 kilo-hertz (KHz) portion of the available frequency spectrum.

Other DSL technologies coexist with POTS by frequency-division multiplexing (FDM) a single data signal onto a logical channel above (at higher frequencies than) the 0 KHz to 4 KHz frequency range used by the analog POTS signals. Such multiplexing techniques and terminology are common to those skilled in the art, and are not described in detail herein. Examples of DSL technologies compatible with POTS include, but are not limited to, Asymmetric Digital Subscriber Line (ADSL), Rate Adaptive Digital Subscriber Line (RADSL), Very High Speed DSL (VDSL), Multiple Virtual Lines (MVL™) and Tripleplay™. Communications systems employing DSL-over-POTS technology may frequency multiplex a plurality of data signals and a single POTS signal onto a single subscriber line. ADSL system employing time-division multiplexing would multiplex a plurality of data signals onto a single logical channel with each different data signal allocated to a predefined portion of time in a predefined, repeating time period. Note that an advantage of TDM is that the transmitter does not actively transmit at all times.

FIG. 1 is a simplified illustrative block diagram of a portion of an existing telephony system 20. A telephone company central office (CO) 22 coupled to communication system network 24 via connection 26. Residing in the CO 22 is at least a signal front end system and a plurality of multiple transceiver units 30 and 32. Each multiple transceiver unit has a plurality of transceiver port cards. For illustration purposes, the multiple transceiver unit 30 has three transceiver port cards 34, 36 and 38. Multiple transceiver unit 32 has two transceiver port cards 40 and 42. A transceiver port card typically includes at least a transmitter signal generating circuitry unit (not shown) for decoding and encoding communication signals into proper formats, and a transmitter (not shown) and a receiver (not shown).

Signal front end system 28 detects incoming communication signals from network 24 which are to be transmitted to any one of a plurality of customer premises (CP). Signal front end system 28 performs the necessary signal processing of the communication signal received from network 24, via connection 26, and passes the communication signal to each of the transceiver port cards 34, 36, 38, 40 and 42, via connection 46. For convenience of illustration, signal front end system 28 is shown connected to the transceiver port cards 34, 36, 38, 40 and 42 via a single connection 46. Alternatively, signal front end system 28 may be connected to the transceiver port cards 34, 36, 38, 40 and 42 via a plurality of individual connections or in any other convenient manner. Similarly, connection 26 is shown as a single connection for convenience.

The transmitter signal generation circuitry (not shown) further process the communication signal. A common example of the transmitter signal generation circuitry known to those skilled in the art is a digital signal processor (DSP). Such processing may include modulation of the communication signal for transmission to a CP 44, and demodulation of a communication signal received from CP 44. The transmitter signal generation circuitry passes the processed communication signal to a transmitter (not shown) residing in the transceiver port card 34, 36, 38, 40 and 42. The transmitter then provides the necessary communication signal amplification so that a communication signal having the proper signal strength can be transmitted, via the output connection 48 of the transceiver port card 34, 36, 38, 40 and 42, onto a subscriber loop 50, for transmission to a CP 44. For convenience of illustration, three CP 44s are shown. Typically, CO 22 would be in communication with hundreds of CPs.

Subscriber loop 50 may be any suitable connection for communicating electrical signals, but is typically a copper wire pair, as is well known in the art, that was originally designed to carry a 0-4 KHz analog voice channel (POTS signal). When a copper wire pair is used for data signal transmission, the wire pair is often referred to as a digital subscriber loop (DSL).

Many other components typically reside in CO 22 which are not illustrated in FIG. 1 for convenience. For example, no digital receiver circuitry, POTS signal circuitry, couplers between the POTS and the digital systems, power supplies and line splitters are shown in FIG. 1. Such components are not described in detail herein as these components are well known in the art. Furthermore, not all of the components residing in the signal front end system 28 or the transceiver port card 34, 36, 38, 40 and 42 are described herein in detail or illustrated in FIGS. 1-3 other than to the extent necessary.

Located within the CP 44 may be a plurality of digital equipment devices which transmit and receive data signals over subscriber loop 50. For convenience of illustration, a personal computer (PC) 52 is shown residing in CP 44 and coupled to subscriber loop 50. Illustrative examples of other digital equipment devices include, but are not limited to, facsimile (FAX) machines, set top boxes, internet appliances, computers or the like. PC 52 includes a modem (not shown), or the like, coupled to subscriber loop 50. PC 52 may communicate with a plurality of other digital equipment devices (not shown) via an Ethernet (not shown), other local access network (LAN), or the like (not shown). PC 52 includes user interface devices, such as keyboard 54 and/or viewing screen 56, to interface with a user (not shown).

A modem (not shown), typically residing in PC 52, decodes a data signal received from the transmitter (not shown) over the subscriber loop 50. The modem also transmits communication signals onto the subscriber loop 50 which have been generated by PC 52 or other similarly functioning digital device residing in the CP 44, to a receiver (not shown) residing in the transceiver port card 34, 36, 38, 40 and 42. Typically data is communicated using a communication signal that has been modulated. Modulation schemes used to communicate between CO 22 and a CP 44 may include, but are not limited to, carrierless amplitude/phase modulation (CAP), quadrature amplitude modulation (QAM), Discrete Multi Tone (DMT) or pulse amplitude modulation (PAM), and are commonly known in the art and are not described in detail herein.

Prior art digital communication systems, like the signal front end system 28 and the multiple transceiver unit 30 having a plurality of transceiver port cards 34, 36, 38, 40 and 42, illustrated in FIG. 1, are often added into an existing CO 22 so that the digital communication system can utilize existing POTS facilities, such as subscriber loops, power supplies, building structures, grounding and protection facilities, etc. Also, it may be desirable to expand already existing digital communication facilities residing in the CO 22. However, electrical code requirements, regulations and/or rules pertaining to the heat generated by communication system components may limit the size of the digital communication system addition or expansion. Such code requirements specify the maximum heat generation allowed per unit size of floor space and/or per unit size of cabinet volume.

Each transceiver port card 34, 36, 38, 40 and 42 in the rack has a specified heat dissipation value based upon maximum theoretical utilization of the transceiver and its associated components (the transceiver residing in the transceiver port card running at a full data transmission or data receive rate). Thus, the maximum number of transceiver port cards 34, 36, 38, 40 and 42 that may be installed into a single multiple transceiver unit 30 is determined by summing each individual port card theoretical maximum heat dissipation value up to the total maximum heat dissipation allowed in a single multiple transceiver unit 30, as specified by code. Because of the large amount of heat dissipated by the components on a single transceiver port card 34, 36, 38, 40 and 42 when running at its maximum theoretical utilization rate, the number of transceiver port cards 34, 36, 38, 40 and 42 that may be installed in a single multiple transceiver unit 30 is limited in prior art communication systems.

Due to the statistical nature of digital data communications, which are typically bursty in nature (brief periods of heavy data transmission followed by periods of inactivity), transceiver port cards 34, 36, 38, 40 and 42 are rarely each running at their maximum theoretical utilization rate. Furthermore, the probability that all transceiver port cards 34, 36, 38, 40 and 42 will be operating at their maximum theoretical utilization rate at the same time is very low. Therefore, it can be expected with reasonable certainty that the amount of heat dissipation for the multiple transceiver unit will not reach the maximum heat dissipation specified by code in a typical installation. Thus, fewer transceiver port cards are installed in a multiple transceiver unit than the number of transceiver port cards that could be installed if a more realistic transceiver port card heat dissipation rate could be realized.

Consequently, a way to guarantee that a single transceiver port card 34, 36, 38, 40 and 42 will operate at a specified heat dissipation rate less than the maximum theoretical utilization rate is desirable. Such a guarantee would allow code certification of a single multiple transceiver unit 30 having a greater number of transceiver port cards 34, 36, 38, 40 and 42, thereby utilizing previously unused space typically available in the multiple transceiver unit 30. Therefore, it is desirable to limit power consumption in transceiver port cards 34, 36, 38, 40 and 42 in an efficient and cost effective manner. Reducing power consumption in the transceiver port cards 34, 36, 38, 40 and 42 would facilitate a more compact construction of an electrical code compliant digital communication system.

SUMMARY

The present invention, a power budgeter, controls the rate of data flow in a transceiver. The power budgeter is implemented by monitoring transceiver activity (data flow) during a predefined period (such as one second), and limiting transceiver data transmit and receive rates during times when the transceiver activity would otherwise exceed a predefined threshold. If total data flow in the monitored time period exceeds the threshold, data flow through the active transceiver during the next (second) time period is limited. Data flow rates are limited in a transceiver by shutting off the transceiver (receiver and/or transmitter) for a specified portion of the second time period. In other types of transceivers, the transmitter and/or receiver may be forced into a low-power idle state or similar operating condition for a specified portion of the second predefined time period.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The power budgeter system, as defined in the claims, can be better understood with reference to the following drawings. The components within the drawings are not necessarily to scale relative to each other, emphasis instead being placed on clearly illustrating the principles of the power budgeting system and method.

Figure 1:
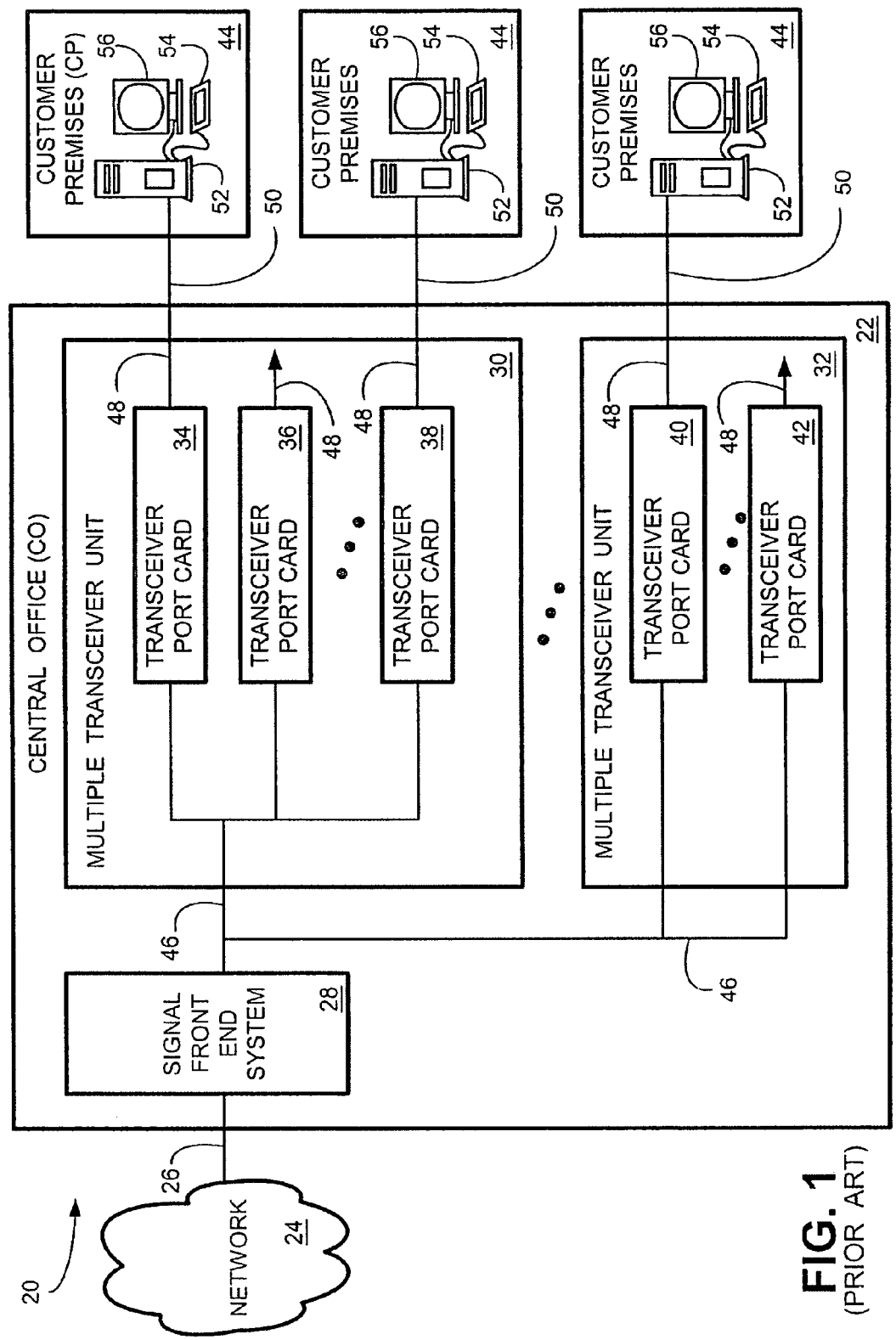
FIG. 1 is a simplified illustrative block diagram of a portion of an existing telephony system.

For convenience of illustration, elements among the several figures that are similar to each other may bear the same reference numerals. Such elements bearing the same reference numerals may be considered to be like elements; however, since these like numeraled elements are incidental to the operation of the present invention which utilizes existing portions of a communication network, one skilled in the art will realize that like numeraled elements among the several figures need not be identical, as any variations of such elements will not adversely affect the functioning and performance of the present invention. Furthermore, like elements that are like-numbered may be described in detail only in the first instance of occurrence, and not described in detail again when occurring in subsequent figures.

DETAILED DESCRIPTION

A. Overview of the Power Budgeting System and Method

The present invention, a power budgeter, controls the rate of data flow in one or more transceivers among a plurality of transceivers. A transceiver is typically mounted on a transceiver port card that is installed in a multiple transceiver unit, usually a large cabinet enclosure for housing the transceiver port cards and other various components. It is desirable to limit power consumption in each individual transceiver during times when a plurality of transceivers are actively transmitting or receiving data. Limiting the power consumption in a transceiver reduces the heat dissipated by the transceiver. Power in an individual transceiver is reduced by limiting the rate that the transceiver is transmitting or receiving data. Thus, the present invention, a power budgeter, is implemented by monitoring aggregate transceiver activity during a predefined period (such as one second), and limiting transceiver data transmit and receive rates during times when the aggregate transceiver activity would otherwise exceed a predefined threshold.

The predefined threshold corresponds to the maximum amount of allowable heat dissipation in a multiple transceiver unit in which the transceivers reside. During the times when only a relatively few number of transceivers are active (aggregate transceiver activity is less than the threshold), the active transceivers are not limited by the power budgeter. That is, because the total heat dissipated by the active transceivers is less than the heat dissipation limit specified for the multiple transceiver unit, there is no need to limit transceiver activity.

However, if a sufficient number of transceivers are active, such that the total heat dissipation of the active transceivers would exceed the specified limit of the multiple transceiver unit during the monitored time period, the power budgeter operates such that transceiver activity is limited (actual data transmit and receiver rates are throttled back) during the next predefined time period. That is, when aggregate transceiver activity reaches and/or exceeds the predefined threshold during a first time period, transceiver activity during the second time period is limited such that the actual total heat dissipated by all active transceivers during two consecutive predefined time periods is no greater than the specified total heat dissipation for the multiple transceiver unit.

Data flow activity in a transceiver, in one embodiment, is implemented by shutting off transceivers (receiver and/or transmitter) for a specified portion of the second predefined time period. In other types of transceivers, the transmitter and/or receiver may be forced into a low-power idle state or similar operating condition for a specified portion of the second predefined time period.

B. Implementation of the Power Budgeting System and Method

Figure 2:
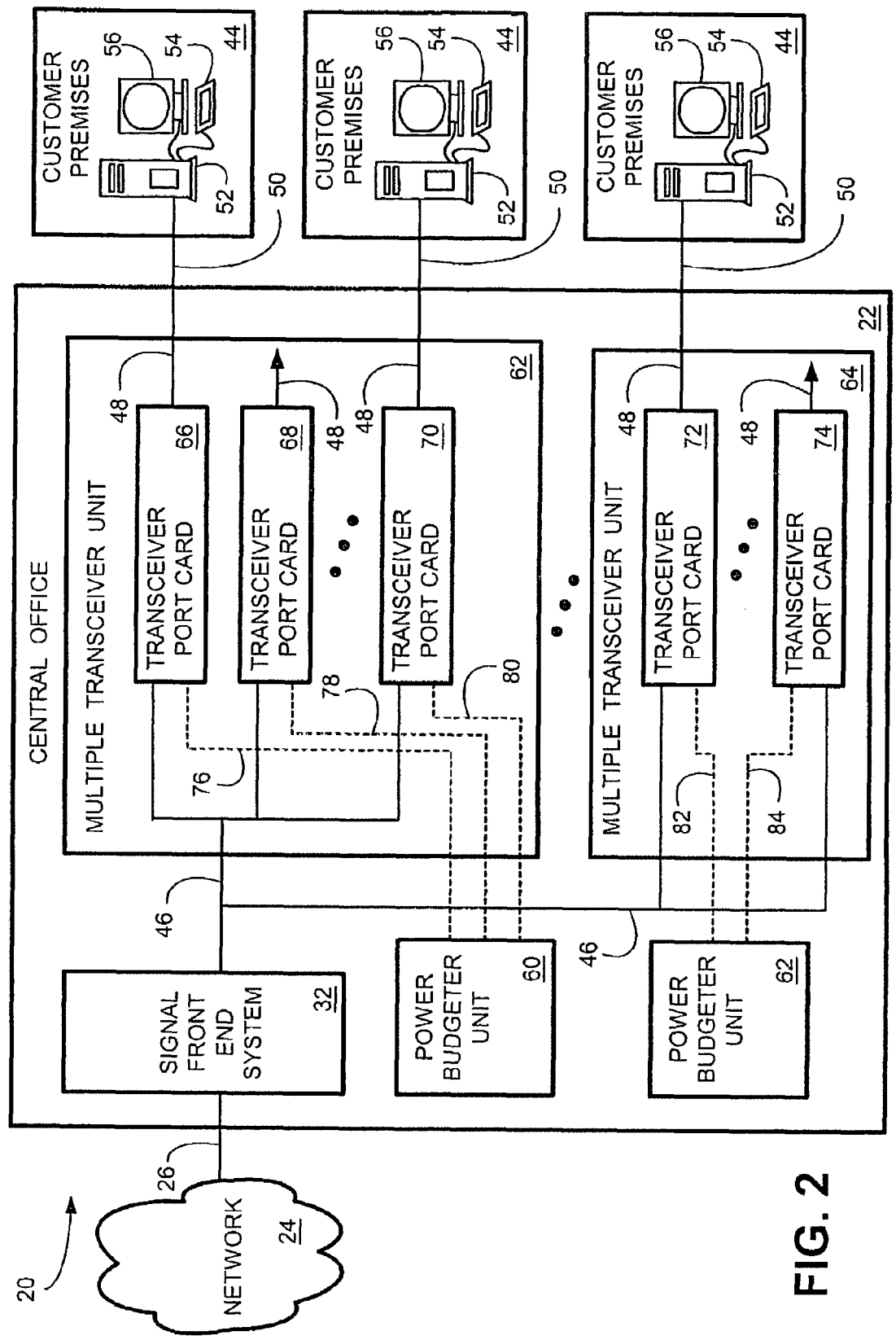
FIG. 2 is a block diagram illustrating a power budgeter unit implemented in the central office (CO) of FIG. 1.

FIG. 2 is a block diagram illustrating two power budgeter units 60 and 62 implemented in the central office (CO) 22 of FIG. 1. Power budgeter unit 60 is coupled to each one of the transceiver port cards 66, 68 and 70 residing in multiple transceiver unit 62. For convenience of illustration, and explanation of the operation and functionality of the present invention, only three transceiver port cards 66, 68 and 70 are shown residing in multiple transceiver unit 62. With the present invention, more than three transceiver port cards (not shown) may be installed in multiple transceiver unit 62, the actual number of transceiver port cards being determined in a manner described below.

Similarly, power budgeter unit 62 is coupled to each one of the transceiver port cards 72 and 74 residing in multiple transceiver unit 64. For convenience of illustration and explanation of the operation and functionality of the present invention, only two transceiver port cards 72 and 74 are shown residing in multiple transceiver unit 62. With the present invention, more than two transceiver port cards (not shown) may be installed in multiple transceiver unit 64, the number of transceiver port cards being determined in a manner described below.

Power budgeter unit 60 is coupled to transceiver port cards 66, 68 and 70 via connections 76, 78 and 80, respectively. Similarly, power budgeter unit 62 is coupled to transceiver port cards 72 and 74 via connections 82 and 84, respectively. For convenience of illustration in FIG. 2, only a single connection 76, 78, 80, 82 and 84 is shown coupling the respective power budgeter units 60 and 62 to the respective transceiver port cards 66, 68, 70, 72 and 74. As will be described in detail below, the single connections 76, 78, 80, 82 and 84 may be two connections in an alternative embodiment.

Power budgeter unit 60 monitors the activity of the transceivers (not shown) residing in each one of the transceiver port cards 66, 68 and 70 in the multiple transceiver unit 62. Power budgeter unit 60 monitors the total data flow in the plurality of active transceivers for a predefined time period, and compares the total transceiver data flow with a threshold in a manner described in detail below. As long as the total transceiver data flow during the monitored time period remains below the threshold, power budgeter unit 60 does not act to limit data transmitting and/or receiving data flow rates in any of the transceivers. However, if total transceiver data flow in transceiver port cards 66, 68 and 70 exceeds the threshold, the power budgeter 60 issues a control signal to active transceivers that limits data flow (transmitting and/or receiving) during the next predefined time period, thereby limiting the total data flow during the two consecutive time periods to no more than the threshold. That is, the power budgeter unit 60 limits data flow in each of active individual transceivers residing in the transceiver port cards 66, 68 and 70 to limit the total heat dissipation rate in the multiple transceiver unit 62 during the two consecutive time periods. Thus, overheating is prevented by the power budgeter unit during periods when total transmitter data flow would otherwise result in total heat dissipation by the multiple transceiver unit 62 in excess of the maximum allowable heat dissipation rate allowed by code.

Similarly, power budgeter unit 62 monitors transceiver data flow in each of the transceiver port cards 72 and 74 residing in multiple transceiver unit 64. Power budgeter unit 62 limits the data flow of the transceivers (not shown) residing in the transceiver port cards 72 and 74 in a similar manner as described for power budgeter unit 60 above. Furthermore, if more than two multiple transceiver units (not shown) reside in the CO 22, power budgeter units may be installed to control transceiver data flow in the other multiple transceiver units.

Figure 3:
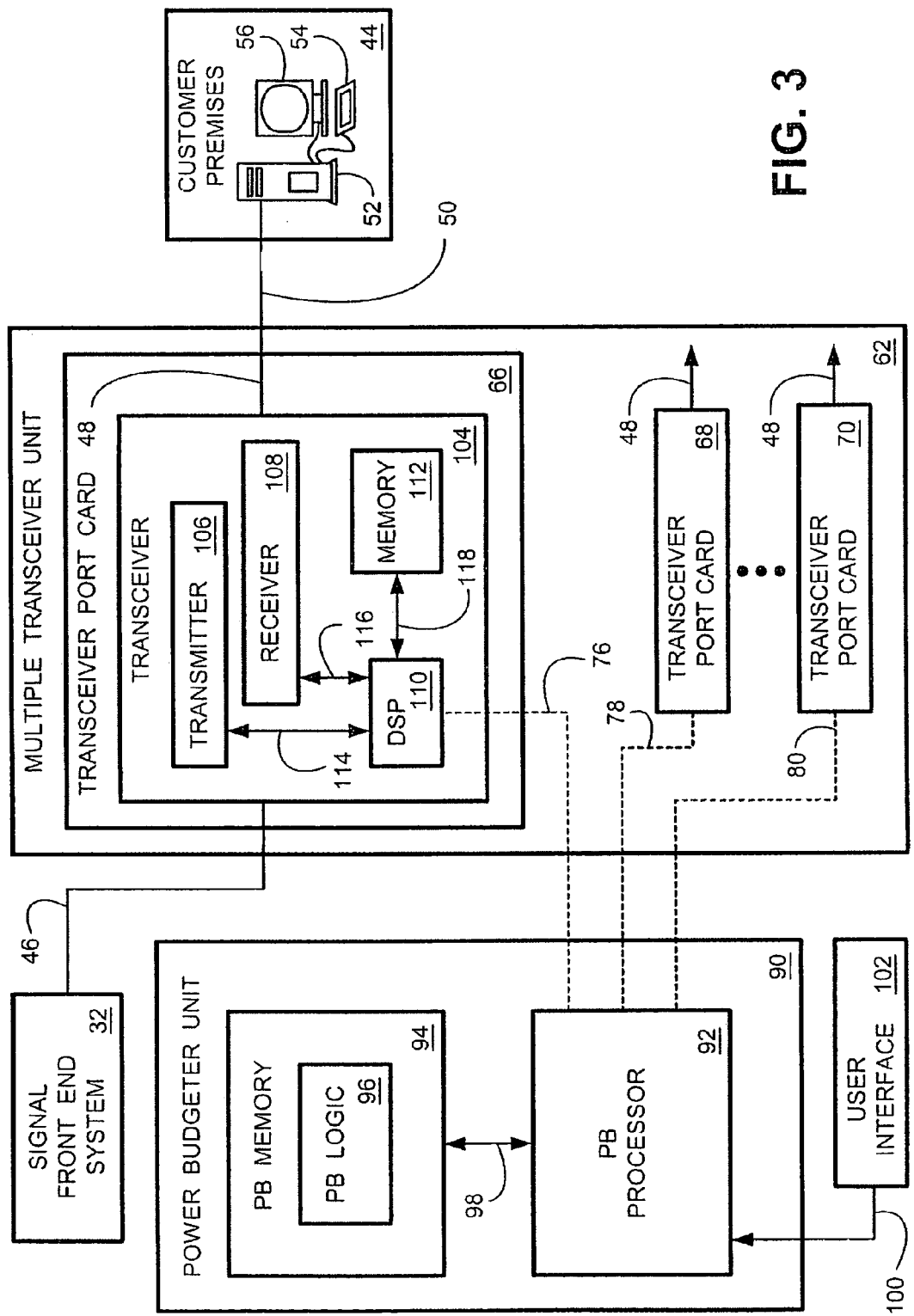
FIG. 3 is a block diagram illustrating selected components residing in the power budgeter unit and a transceiver port card of FIG. 2.

C. Selected Components Residing in a Preferred Embodiment of a Power Budgeter Unit and a Transceiver Port Card FIG. 3 illustrates additional detail of components residing in an embodiment of the power budgeter unit 60 and the transceiver port card 66. Power budgeter unit 60 has at least a power budgeter (PB) processor 92 and a PB memory 94. PB logic 96 resides in memory 94. PB processor 90 is coupled to PB memory via connection 98. Coupled to PB processor 92, via connection 100, is a user interface 102. Alternatively, power budgeter unit 60 may be any suitable processor unit, controller, processing means or controller means performing the functionality of power budgeter unit 60 described herein.

Transceiver port card 66 has at least a transceiver 104. Transceiver 104 has at least a transmitter 106, a receiver 108, a digital signal processor 110 (DSP) and memory 112. DSP 110 is coupled to transmitter 106 with connection 114, coupled to receiver 108 with connection 116, and coupled to memory 112 with connection 118. Connection 48 (see also FIGS. 1 and 2) couples transceiver 104 to subscriber loop 50. DSP 110 is coupled to the PB processor 92, via connection 76, and is configured to communicate with PB processor 92.

DSP 110 performs several functions. One function is signal processing, which includes modulation of a communication signal received from the signal front end system 32 that is to be transmitted by transmitter 106 to CP 44, and demodulation of a communication signal received by receiver 108 from CP 44. DSP 110 may also control the transmit signal power, symbol rate, and/or data transmission rate. DSP 110 may even generate special instructions to other transceivers, such as, but not limited to, a modem residing in PC 50 at CP 44.

DSP 110 is further configured to operate as part of a power budgeter system and method. DSP 110 monitors data flow through transceiver 104 during a predefined time period. More specifically, DSP 110 monitors the data transmitted by transmitter 106 and data received by receiver 108. The data flow information for the predefined time period is stored in memory 112 in a suitable format. In the preferred embodiment, the monitored time period is divided up into small time periods corresponding to data symbol periods. The DSP 110 employs a register or counter to count the number of symbol periods that are being used to transmit data, the number of symbol periods being used to receive data, and the number of inactive periods. This data is stored in memory 112.

Transceiver port cards 68 and 70, and selected other port cards (not shown) residing in multiple transceiver unit 62, are configured and operate similarly to the components residing in transceiver port card 66 described above. However, they do not necessarily need to be identical to each other or to transceiver port card 66. In the preferred embodiment, all transceivers are coupled to the PB processor 92 and controlled by the PB processor 92 in a manner described below.

In the preferred embodiment, PB processor 92 communicates with DSP 110 at the end of the monitored time period (once every second) and receives the data flow information stored in memory 112. Concurrently, PB processor 92 communicates with all other DSPs residing in the multiple transceiver unit 62 and receives data flow information for all transceivers for the same one second period. A total data flow for the one second period is determined. If the total data flow is less than the threshold, PB processor 92 does not limit data flow through any of the transceivers. However, if total data flow equals or exceeds the threshold, a control signal is sent to each DSP 110 ordering a limiting of data flow for the upcoming second. Thus, total data flow through multiple transceiver unit 66 is limited to a level such that the total heat dissipated by all components residing in the multiple transceiver unit 66, including the transceivers, does not exceed the maximum heat dissipation in the multiple transceiver unit 66 allowed by code for a two second time period.

When the total data flow decreases to a suitable level, the limitations to each transceiver are removed, thereby allowing each transceiver to operate at its maximum data transmission rate. The process of applying and removing limitations to transceivers is discussed in detail below.

D. Determination of the Threshold

As described above, PB processor 92 compares the actual total data flow rate (data transmitted and data received) to a threshold. Therefore, the threshold corresponds to the maximum heat dissipation in a multiple transceiver unit 62 specified by code. The threshold is calculated by taking the maximum allowable heat dissipation in multiple transceiver unit 62 specified by code, subtracting the heat dissipated by the common components residing in the multiple transceiver unit 62, and then correlating the remaining allowable heat dissipation to a data flow rate. That is, the remaining allowable heat dissipation corresponds to the maximum amount of total data traffic through all transceivers residing in the multiple transceiver unit 66.

As noted above, the heat dissipated by the common components (not shown) residing in the multiple transceiver unit 66 is first subtracted out. Such common components may include, but are not limited to, power supply components, controllers, POTS splitters, cooling fans or the like.

Knowing the actual heat dissipated by the transceivers for various data flow rates, the actual total heat dissipated by all transceivers may be computed. Actual heat dissipated by a transceiver can be determined with the following equation:

$$(\text{Heat Dissipated}) = \\ [(\% \text{ Time Transmitting}) \times (\text{Transmitter Heat Rate})] + \\ [(\% \text{ Time Receiving}) \times (\text{Receiver Heat Rate})] + \\ [(\% \text{ Time Inactive}) \times (\text{Inactive Heat Rate})]$$

As described above in the preferred embodiment, the percent (%) time that the transceiver is transmitting, receiving, or inactive can be determined by first counting the number of symbol periods that the transceiver is transmitting, is receiving and is inactive. Then, the ratio of the counted symbol periods for the transmitting, receiving, and inactive states to the total number of symbol periods is calculated for the monitored time period.

The threshold value can be determined based upon the amount of data flow limitations that will be imposed on customers and anticipated operating conditions. The designer will use good engineering judgement and practices in specifying the threshold and in designing the slow down algorithm (process of applying limitations to the transceivers) that will be executed by the power budgeter. Such a calculation of the threshold and the slow down algorithm is particularly well suited for calculating with a spread sheet, and may be individually tailored for each specific installation where a power budgeter system and method is employed. Furthermore, a wide variety of factors may be considered in each specific installation. Such factors may include, but are not limited to:

the heat dissipated by a transceiver unit during transmitter activity,
the heat dissipated by a transceiver unit during receiver activity,
the heat dissipated by a transceiver unit during no activity,
the transceiver types deployed in the multiple transceiver unit,
the statistics of the data flow through the transceivers,
the minimum data flow rates acceptable to the customer, and/or
the actual number of transceivers deployed in the multiple transceiver unit.

Other factors may also be relevant. Because the determination of each threshold is easily calculated based upon the specific installation where a power budgeter system and method is employed, and because the number of factors considered may be great, a detailed description of a threshold calculation algorithm cannot be provided in detail herein. However, a series of simplified hypothetical scenarios are discussed below which will teach one skilled in the art the method of determining the threshold, and how to apply the threshold, for any specific installation.

E. Illustrative Hypothetical Scenarios for Determining the Threshold

Consider the simplified illustrative scenario of a multiple transceiver unit having ten transceiver port cards installed in a seven foot rack enclosure. Network Equipment-Building System (NEBS) limits the total heat dissipation in the multiple transceiver unit enclosure to 1268 watts using the standard NEBS floor plan. After subtracting out the power dissipation associated with the common components, assume that 1000 watts remains for heat dissipation by the ten transceivers. If the maximum heat dissipated by each transceiver at a maximum data flow rate is 100 watts, then all ten transceivers could operate at full capacity without any limitations because the maximum allowable heat dissipation specification of 1268 watts would never be exceeded.

Figure 4:
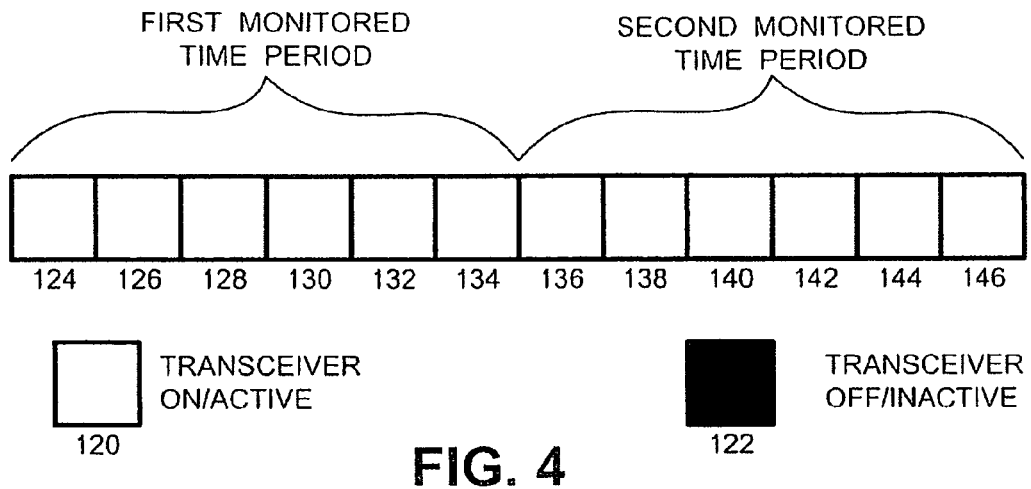
FIG. 4 is a simplified illustrative diagram showing a first and second monitored time period of an active transceiver of FIG. 2.

Such a scenario is illustrated in FIG. 4. FIG. 4 is a simplified illustrative diagram showing a first and second monitored time period of an active transceiver. The first and second time periods each have a equal plurality of symbol periods 124-146. Symbol periods 124-146 correspond to data packets in a digitalized communication system. Thus, symbol periods 124-126 are intended as a generalized, simplified representation of data flow in packet based system. If the transceiver is on, and/or actively communicating data, the symbol period 120 is illustrated as having a white filled background. If the transceiver is off, inactive, or in a low power state, the symbol period 122 is illustrated as having a black filled area. For convenience of illustration, and for explaining the operation and functionality of the present invention, the first time period is illustrated as having only six symbol periods 124-134, and the second time period is illustrated as having six symbol periods 136-146. One skilled in the art will appropriate that a monitored time period would typically have many symbol periods. FIG. 4 illustrates that all of the symbol periods 124-134 in the first monitored time period and all of the symbol periods 136-146 in the second monitored time period are active.

However, consider another simplified scenario where the maximum heat dissipated by each transceiver at a maximum data flow rate is 200 watts. If ten transceivers were installed in the multiple transceiver unit, and if all ten transceivers were operating at their maximum rate, the total heat dissipation rate would equal 2000 watts plus the 268 watts dissipated by the common components. This total heat dissipation of 2268 watts would exceed the maximum 1268 watt specification for the multiple transceiver unit allowed by the NEBS code. Thus, such an installation of ten transceivers would not be permitted if code is to be adhered to. Furthermore, only five of the exemplary transceivers could be installed in the multiple transceiver unit under this scenario. (Five transceivers times 2000 watts each, plus 268 watts for the common components, equals the 1268 watts specification.) If the multiple transceiver unit had space available to accommodate more than five transceivers, space would be wasted. This wasted space translates to economic inefficiencies in that the wasted space is a valuable resource.

Next, consider the illustrative example of a multiple transceiver unit 62 (FIG. 2) having ten transceiver port cards installed in a seven foot rack, where the maximum heat dissipated by each transceiver at a maximum data flow rate is 200 watts, and where each transceiver 104 is controlled by a power budgeter unit 90. Given that the common components dissipate 268 watts, the threshold is calculated to correspond to the 1000 watts of remaining heat dissipation allowed by the NEBS code. In a first scenario, assume that five transceivers are actively transmitting/receiving data at their maximum data flow rates such that the heat dissipation equals 200 watts per transceiver, and assume that the other five transceivers are inactive (no heat dissipation). The PB processor 92 would monitor data flow rates for each transceiver for a one second period and compare the total data flow rate with the threshold. Here, since the total heat dissipation equals 1268 watts (the NEBS code is not violated), the total data flow rate would equal the threshold. Therefore, the PB processor 92 would not act to limit data flow in the transceivers.

Next, consider a scenario where all ten transceivers are transmitting/receiving, but at a rate equal to fifty percent (50%) of their maximum data flow rates such that the heat dissipation equals 100 watts per transceiver. Like the first scenario above, the total heat dissipation equals 1268 watts (the NEBS code is not violated) and the total data flow rate would equal the threshold during the monitored second. Therefore, the PB processor 92 would not act to limit data flow in the transceivers.

However, consider a scenario where one of the transceivers operates at a rate of sixty percent (60%) of its maximum data flow rate such that the heat dissipation equals 120 watts (60% of 200 watts), and the remaining nine transceivers are operating at a rate equal to 50% of their maximum data flow rate (heat dissipation equals 100 watts per transceiver). During the monitored one second time period, the total heat dissipated in the multiple transceiver unit is 1280 watts, which exceeds the 1268 watts NEBS code by 20 watts. The PB processor 92, after determining that the actual data flow rate (that corresponds to a heat dissipation of 1280 watts), would then order a reduction of the data flow rates in selected transceivers so that the total data flow rate during the next second is reduced such that the total heat dissipated decreases to a rate of 1248 watts. One possible solution would be to limit all transceivers to a 49% data flow rate such that the total heat dissipation rate is 98 watts per transceiver (ten times 98 watts, plus 268 watts, equals the desired 1248 watts). Another possible solution would be to select one of the transceivers and throttle down the data flow rate to 40%. This solution may be particularly desirable if the customer transmitting through the selected throttled receiver was receiving a special or discounted rate of service that corresponds to the 40% rate (or less).

In the hypothetical example above, data flow was limited during the second second such that the total heat dissipated during the two second time period was in compliance with the 1268 watts NEBS code. During the third second, data flow limitations, in the preferred embodiment, are adjusted so that total heat dissipated by the ten active receivers was equal to the 1268 watts NEBS code. That is, data flow rates are adjusted so that the total heat dissipation in the third second increases back up to 1268 watts (as compared to the 1248 watts allowed in the second second).

However, consider the hypothetical scenario where there are eleven transceivers, ten transceivers operating at 100 watts each, the eleventh transceiver being inactive (assume that negligible heat is dissipated by this transceiver). During the monitored second, the 1268 watts NEBS code is satisfied. Now, assume that a customer using the eleventh transceiver begins transmitting/receiving data at a maximum data flow rate (equivalent to 200 watts). During the monitored second before the eleventh transceiver became active, the 1268 watts NEBS code was satisfied. When the eleventh transceiver becomes active, the 1268 watts NEBS code will be exceeded by 200 watts. Here, the power budgeter will have to operate to reduce data flows during the third second so that the total heat dissipated during the second and third seconds is in compliance with the 1268 watts NEBS code. In the preferred embodiment, inactive transceivers are allowed to turn on and transmit/receive data without any restrictions. Only during the next second is the newly active transceiver subject to limitations.

One skilled in the art will appreciate that the possible solutions to limit aggregate transmitter data flow over two successive time periods to the threshold are too numerous to describe in detail herein. Furthermore, one skilled in the art will appreciate that an optimal solution for any specific installation can be easily determined using the method described in the hypothetical example above. All such various solutions are intended to be within the scope of this disclosure and to be protected by the accompanying claims.

F. Restricting Data Flow Using the Threshold

Once the total data flow rate during the monitored time period, one second in the preferred embodiment, exceeds the threshold, the power budgeter unit 90 executes the PB logic 96 residing in PB memory 94. Referring to the single power budgeter unit 90 illustrated in FIG. 3, the restrictions placed on the active transceiver 104 can be determined simply by dividing the threshold (after subtracting out a value for the common components) by the number of active receivers. The resultant limit equals the maximum allowed data flow rate for the transceiver 104 and corresponds to the amount of heat dissipation by the transceiver 104 and other components (not shown) residing on the transceiver port cards 66. Similarly, the transceivers (not shown) on port cards 68 and 70 (and all other transceivers not shown) would be subjected to the same data flow restriction.

Figure 5:
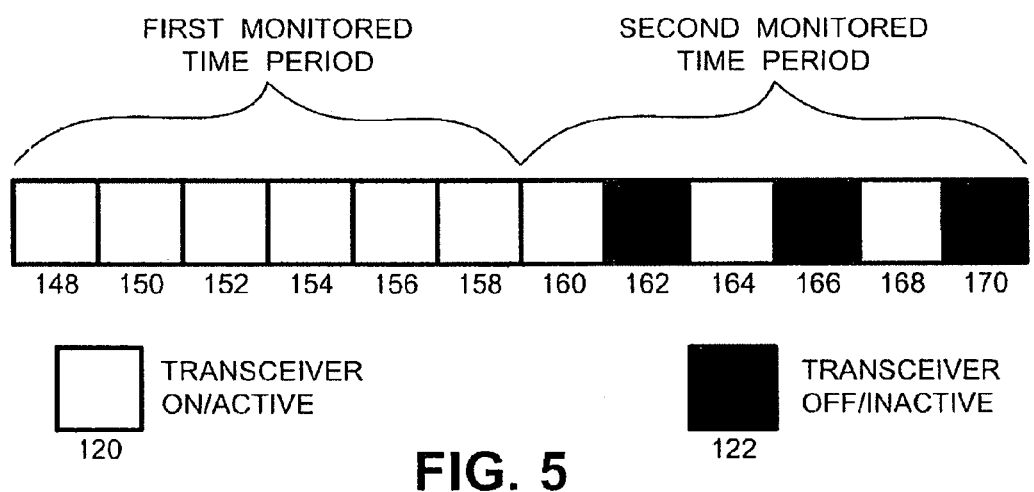
FIG. 5 is an illustrative diagram showing one possible method used to apply limitations to a transceiver of FIG. 2.

FIG. 5 is an illustrative diagram showing one possible method used to apply data flow limitations to a transceiver. During the first monitored time period, the transceiver is shown as operating in a fully on state, or a fully active state. That is, each of the six symbol periods are shown to be actively communicating data. In the second monitored time period, the power budgeter unit 90 (FIG. 3) has applied a limitation to the transceiver equal to a 50% reduction in the data flow rate. Power budgeter unit 90 implements this 50% reduction in the data flow rate in the second monitored time period by turning off the transceiver during every other symbol period (162, 166, 170). A customer transferring data through this transceiver would experience a brief slow down in the transmission of the data. The net data flow rate for both the first monitored time period and the second monitored time period is equal to a net 75% data flow rate. That is, the power budgeter unit 90 determines that the threshold was exceeded during the first monitored time period, and that the transceiver data flow rate needs to be slowed down by 50% during the second monitored time period so that the total heat dissipated during the first and second time periods equaled 75% of the heat dissipation rate of a fully active transceiver.

Figure 6:
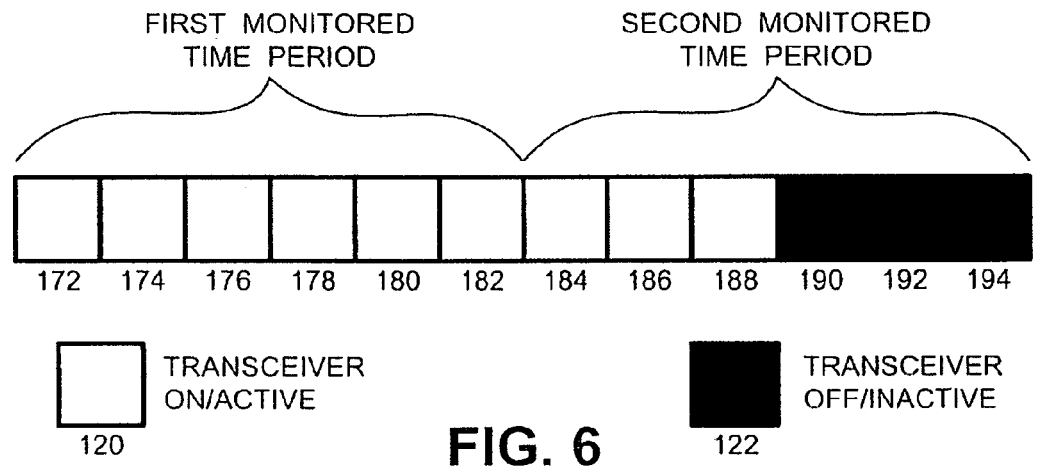
FIG. 6 illustrates an illustrative diagram showing another possible method used to apply limitations to a transceiver of FIG. 2.

FIG. 6 is an illustrative diagram showing another possible method used to apply data flow limitations to a transceiver. The power budgeter unit 90 implements the 50% data flow restriction to the transceiver during the second monitored time period by allowing the transceiver to be active during the first symbol periods 184-188. During the next three (3) data symbol periods 190-194, the power budgeter unit 90 shuts off the transceiver.

One skilled in the art will appreciate that the two techniques employed by the power budgeter unit 90 to slow the transceiver down to a 50% data flow rate in the second monitored time period illustrated in FIGS. 5 and 6 represent two of a many possible methods of implementing a slow down in the data flow rate. For example, the first three symbol periods 184-188 may have been the selected off times for the transceiver and the symbol periods 190-194 could have been selected as the on times for the transceiver. Given that a monitored time period may be specified such that each monitored time period has many symbol periods, PB logic 96 residing in PB memory 94 could be configured to implement a data flow rate slow down in a transceiver to a desired flow rate by selecting a suitable combination of symbol periods that the transceiver is to be shut off (inactive). Furthermore, the limitations imposed by the power budgeter unit 90 during the second monitored time period was described in reference to the transceiver. One skilled in the art will appreciate that the transmitter 106 and receiver 108 residing in transceiver 104 could be controlled by DSP 110 so that the transmit symbol periods and the received symbol periods are coordinated so that the transmitter 106 and the receiver 108 are active or inactive at the same times. Another embodiment may have the DSP 110 enable the transmitter 106 at different times than the receiver 108, or may even allow the transmitter 106 to be active for more symbol periods or less symbol periods than the receiver 108. Thus, the preferred embodiment of the PB logic 96 residing in the power budgeter unit 90 has a variety of user selectable options that enable the power budgeter unit 90 to be tailored to provide control of the DSP 110 according to the specific needs of each unique installation.

However, the simplistic method described above is very inefficient in applying restrictions to the transceivers and would, by itself, likely result in an inefficient use of the available data flow capacity during the second second to which the limitations are imposed. For example, the above restriction allocation method assumes that each active transceiver is operating at a maximum data flow rate. If one of the active transceivers was actually operating at a 10% data flow rate during the first monitored time period, and the restriction applied during the second monitored time period was 48% (as in the hypothetical example above), then the difference between the actual 10% rate and the 48% restriction would not be utilized during the restriction period. Furthermore, it would be desirable to allocate this underutilized resource to other active transceivers. It may be desirable to allocate the available unused data flow capacity evenly among all active transceivers. Or, it may be desirable to allocate the available unused data flow capacity to selected transceivers used by preferred customers or premium service customers. Thus, the preferred embodiment of the PB logic 96 residing in the power budgeter unit 90 has a variety of user selectable options that enable the power budgeter unit 90 to fully allocate data flow capacity among the active transceivers, and thus be tailored to the specific needs of each unique installation. During installation, the installer could specify the features to be applied by programming the power budgeter unit 90 through interface 102. Furthermore, if system needs change after the initial installation, the power budgeter unit 90 could be easily reprogrammed to provide optimal regulation of the transceivers.

Different types of transceivers may be individually programmed to have different data flow limitations. For example, a first type of data transceiver may be a specialized transceiver having a very high throughput capability. A second type of transceiver may be a lower grade economy model or an older generation model having a low throughput capability. The installer may limit the first type of data transceiver to a rate that corresponds to a rate that provides a reasonable rate of data flow for the customer during periods of data flow restrictions. On the other hand, the installer may choose not to apply a limit to the second type of data transceiver because a restriction might render the transceiver practically unusable. The feature would be particularly advantageous when dealing with systems having a mix of older and newer technology.

Premium service customers may be paying for a higher quality of service. In this situation, no restriction or a limited restriction could be placed on the transceiver(s) serving the premium service customer(s). This feature is implemented in the PB logic 69 by simply subtracting out the restriction applied to the transceiver(s) serving the premium service customer(s) before allocating the remaining data flow capacity among the other active transceivers.

Economy or budget service customers may have agreed to a lower quality of service in return for a discount service fee. In this situation, a large restriction could be placed on the transceiver(s) serving the economy or budget service customer(s). This feature is implemented in the PB logic 69 by simply subtracting out the restriction applied to the transceiver(s) serving the economy or budget service customer(s) before allocating the remaining data flow capacity among the other active transceivers.

A minimum threshold may also be considered such that the restriction period is extended into subsequent monitored time periods so that a minimum service level to all active transceivers can be maintained. Here, the calculated restriction to be applied to the active transceiver(s) during the second second, the restriction period, is compared to the minimum threshold. If the calculated restriction is above the minimum threshold, the restriction is applied to the active transceiver(s). However, if the calculated restriction is below the minimum threshold, the restriction is adjusted to correspond to the minimum threshold level. In this situation, the restrictions would be continued onto subsequent time periods until the total heat dissipation during all of the time periods comes into compliance with the maximum allowable heat dissipation specification. Furthermore, individual transceivers may have their own minimum threshold. This feature would be particularly advantageous when minimum data flow rates must be maintained to ensure adequate quality of service.

Other features may also be included in the PB logic 96. One skilled in the art will appreciate that the preferred embodiment of the power budgeting invention having a wide variety of programmable features is particularly advantageous.

G. Releasing Data Flow Restrictions

After the conclusion of the restriction time period, the total heat dissipated in a multiple transceiver unit during the two consecutive time periods will be in compliance with the maximum allowable heat dissipation rate allowed by code. However, in the next time period, restrictions may still be required because the transceivers might otherwise, if not restricted, operate at data flow rates that would cause a violation of the maximum allowable heat dissipation rate allowed by code. That is, the aggregate data flow rate of the transceivers, if unrestricted, would exceed the threshold. Therefore, the preferred embodiment of the power budgeter unit 90 (FIG. 3) incorporates in PB logic 96 various means of recalculating transceiver restrictions for subsequent time periods.

The simplest approach calculates limitations to the active transceivers by dividing the threshold evenly among the active transmitters. However, additional features provide for a more efficient reallocation method.

Premium service customers, paying for a higher quality of service, have their guaranteed data flow rate specified for their transceiver(s). This guaranteed rate is subtracted out of the threshold. Then, the remaining threshold is evenly allocated among the remaining transceivers. Similarly, economy or budget service customers have their guaranteed data flow rate specified for their transceiver(s). Then, the remaining threshold is evenly allocated among the remaining transceivers. If both premium and economy/budget customers are serviced from transceivers residing in a multiple transceiver unit 62, the premium service data flow rates and the economy/budget data flow rates are subtracted out of the threshold. Then, the remaining threshold is evenly allocated among the remaining transceivers.

Another feature includes a holdback. Here, a portion of the threshold is held back so that when inactive transceivers became active, there is some amount of data flow capacity available to the newly active transceiver such that the maximum allowable heat dissipation rate allowed by code is not exceeded. Alternatively, the amount of hold back might be less than the requirement to accommodate a newly active transceiver operating at full data transfer capacity. The hold back amount might correspond to some reasonable limitation that is automatically applied to the newly active transceiver.

Yet another feature compares the calculated limitations of active transceivers with actual data flow rates of the transceivers. If the actual data flow rate was less that the calculated limit for any transceiver, the difference is reallocated in some suitable manner to other transceivers.

Furthermore, the power budgeter unit 90 could be programmed to periodically, or even continually, execute the reallocation process in PB logic 96. Repeating the allocation process periodically ensures optimal system performance on a continuing basis.

Other features may also be easily included in the PB logic 96. One skilled in the art will appreciate that the preferred embodiment of the power budgeting invention having a wide variety of programmable features will be particularly advantageous in the reallocation of restrictions in subsequent time periods.

Summarizing, the power budgeter unit 90 monitors aggregate data flow during a monitored time period for all active transceivers. If the aggregate data flow rate in all active transmitters exceeds a predefined threshold, the power budgeter unit 90 effects a data slow down in the active transmitters.

Figure 7:
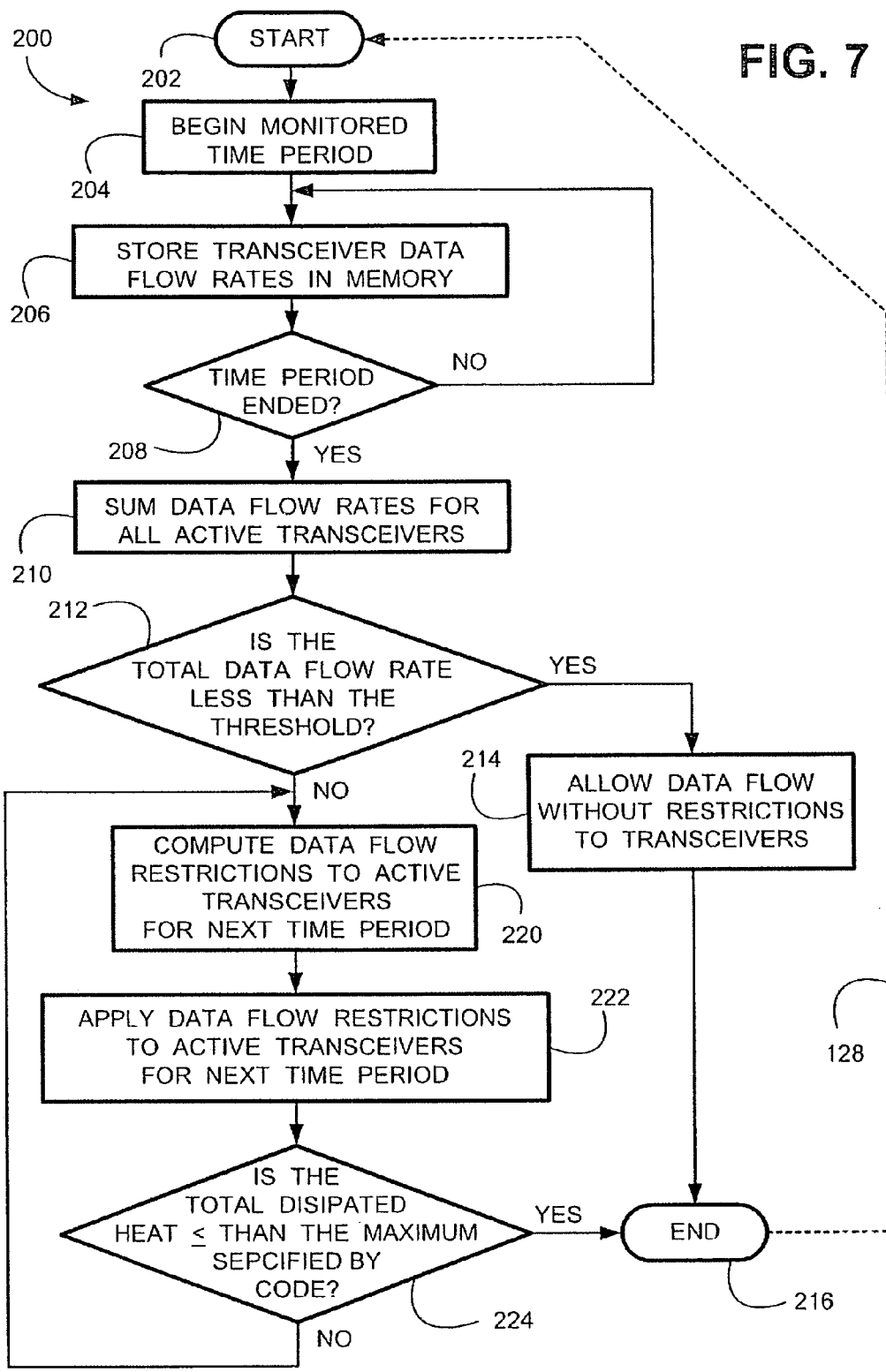
FIG. 7 is a flow chart illustrating the process of monitoring data flow in implementing data flow restrictions when aggregate data flow of all active transceivers of FIG. 2 exceeds the predefined threshold.

FIG. 7 is a flow chart 200 illustrating the process of monitoring data flow and implementing data flow restrictions when aggregate data flow of all active transceivers exceeds the predefined threshold. The process starts at block 212. DSP 110 (FIG. 3) monitors the data flow in transmitter 106 and receiver 108 at the beginning of the monitored time period, as shown in block 202. At block 206 the DSP 110 stores the data flow rate information in memory 112. At block 208, power budgeter unit 90 determines if the monitored time period has ended. If the monitored time period has not ended (the NO condition) the process continues back to block 206 for the further accumulation of transceiver data flow rates in memory 112.

If the monitored time period has ended (the YES condition) at block 208, the process proceeds to block 210. At block 210, power budgeter unit 90 retrieves the data flow rates for the monitored time period for all active transceivers and sums the data flow rates to determine the aggregate data flow rate for all active transceivers during the monitored time period. At block 212, the aggregate total data flow rates for all active transceivers is compared with the threshold. If the aggregate total data flow rate is less than the threshold (the YES condition) the process proceeds to block 214. Block 214 indicates that the power budgeter unit 90 allows data flow through all transceivers without restrictions. The process then ends at block 216. The dashed path line 218 indicates that the process returns to start block 202 for the next time period.

If at block 212 a determination is made that the aggregate total data flow rate of all active transceivers was greater than or equal to the threshold (the NO condition) the process proceeds to block 220. At block 220, the power budgeter unit 90 computes the necessary data flow restrictions to be applied to the active transceivers during the next time period. At block 222, power budgeter unit 90 instructs the DSP 110 to apply the data flow restrictions to the active transceivers for the next time period. At block 224 the power budgeter unit 90 determines whether or not the data flow rate restrictions were sufficient to result in the total heat dissipated during the two consecutive time periods to be less then the maximum heat dissipated allowed by code. If the total heat dissipated during the two consecutive time periods is less than the maximum specified by code (the YES condition) the process ends at block 212 (and then immediately proceeds to block 202 to start for the next time period).

However, if the total heat dissipated during the two consecutive time periods was greater than the maximum specified by code (the NO condition), the process returns to block 220 to determine appropriate data flow restrictions to the active transceivers for the third time period. This process would continue for as many subsequent time periods as necessary so that the total dissipated heat would eventually be less than the maximum specified by code. This feature, represented by blocks 220, 222 and 224, would be particularly advantageous in situations where the data flow restrictions applied by the power budgeter unit 90 to the active transceivers could not exceed a predefined minimum data flow rate. That is, power budgeter unit 90 would not impose limitations on the active transceivers below data flow rates tolerable by customers serviced by the active transceivers.

H. Credit Based Restrictions

The preferred embodiment of a power budgeter unit 90 employs a credit based system in determining the data flow restrictions to be applied to active transceivers. One such illustrative example of a credit based system assigns transmit credits and receive credits to the transceivers. The transmit credits correspond to the number of symbol periods that the transmitter 106 is allowed to transmit data, and the receive credits corresponds to the number of symbol periods that the receiver is allowed to receive data. A transmit credit may correspond to a single symbol period, or to any other suitable number of symbol periods depending upon the specific needs of each unique installation. During installation, the installer specifies the corresponding number of symbol periods that would be associated with each credit. Alternatively, the number of symbol periods associated with each credit could be predefined.

Alternative embodiments of the power budgeter unit 90 may use other systems and methods of imposing data flow limitations on active transceivers. For example, but not limited to, power budgeter unit 90 could specify the data flow limitations in terms of time periods. That is, the power budgeter unit 90 would specify the time that the transceiver would be allowed to be active and the time when the transceiver would be shut down during the time period when data flow restrictions are applied. One skilled in the art will appreciate that numerous systems and methods are available for applying data flow restrictions to a transceiver, and that any such systems and methods may be implemented without departing substantially from the spirit and principles of the present invention. All such alternative systems and methods are intended to be included within the scope of this disclosure and to be protected by the claims for the power budgeting invention.

I. Applying Data Flow Limitations to a Transmitter and a Receiver

The preferred embodiment is configured to operate in a data communication system employing digital technologies. Incoming communication data arrives in the format of a packetized stream of data. Examples of such communication systems employing digital technology include, but are not limited to, frame relay data, asynchronous transfer mode (ATM), X.25, Internet protocol (IP) routed and multi-protocol label switching (MPLS) formats. This packetized digital communication format generally adheres to a model, such as the well known Open Systems Interconnect (OSI) seven-layer model, which specifies the parameters and conditions under which information is formatted into a digital packet and transferred over a communications network. Typically, a packet of data includes header information in the layer 2 and/or the layer 3 data that specifies, in part, the destination where the incoming communication signal is to be transmitted to. Similarly, a packet of data includes an end of data indicator at the end of the data packet.

When the power budgeter unit 90 implements a data flow restriction to the active transceivers, the power budgeter unit 90 may simply instruct the DSP 110 to apply the calculated data flow limitation to transmitter 106. Then, during the next monitored time period, transmitter 106 transmits at the specified data flow rate to PC 52. PC 52 simply takes the data at the received rate and processes the received data accordingly. That is, PC 52 may accommodate any variety of data flow rates provided by the transmitter 106.

However, DSP 110 may not simply specify the receive data rate for the upcoming time period to receiver 108. Receiver 108 receives data at a rate that the transmitter residing in PC 52 actually transmits data at. In the preferred embodiment, PB processor 92 instructs DSP 110 to insert at the end of the data packet information correlating to the limitation in the data flow rate that is applicable to receiver 108 in the upcoming time period. This information is transmitted to the PC 52 such that the transmitter residing in PC 52 may be appropriately reset to transmit at the new data flow rate specified for receiver 108.

Alternative embodiments of the power budgeter unit 90 are configured to apply restrictions only to the transmitter 106. Thus, receiver 108 is not restricted and the transmitter residing in PC 52 is allowed to transmit data to receiver 108 at any suitable data flow rate. This embodiment is particularly advantageous when a power budgeter unit 90 is implemented in a communications system having transmitters at the customer premises 44 which are not configured to operate under the control of power budgeter unit 90.

J. Operation of the Power Budgeter with a User Interface

User interface 102 (FIG. 3) is illustrated as being coupled to PB processor 92 via connection 100. User interface 102 is any suitable interface device which allows the installer to provide the necessary information to power budgeter unit 90 so that the operation and functionality may be tailored to the needs of each specific installation. Examples of user interface 102 includes, but are not limited to, a keyboard, a PC, a laser based interface system, a radio based interface system or other suitable interface system whereby the installer can provide the necessary programming information to the power budgeter unit 90. One skilled in the art will appreciate that any suitable user interface 102 may be employed with a power budgeter unit 90 without departing substantially from the spirit and principles of the power budgeting invention. All such modifications and variations are intended to be included within the scope of this disclosure and to be protected by the claims for the power budgeting invention.

K. Alternative Configurations of Components Residing in a Power Budgeter Unit and a Transceiver Port Card Other components, not shown, may be included in the multiple transceiver unit 66, power budgeter unit 90, transceiver port card 66 and/or transceiver 104. FIG. 3 is generally limited to illustrating those components relevant to the operation and functioning of the present invention. These omitted components are not illustrated in FIG. 3 or discussed in detail other than to the extent necessary for an understanding of the operation and functionality of these omitted components in relation to the present invention. Furthermore, the components shown in multiple transceiver unit 66, power budgeter unit 90, transceiver port card 66 and/or transceiver 104 may be configured differently than shown in FIG. 3. Any such alternative embodiments of a multiple transceiver unit 66, power budgeter unit 90, transceiver port card 66 and/or transceiver 104 employing the system and method of the present invention are intended to be within the scope of this disclosure and be protected by the accompanying claims.

PB processor 90 in FIG. 3 may be any suitable custom or commercially available processor. Examples of commercially available processors include, but are not limited to, a Pentium microprocessor from Intel Corporation, Power PC microprocessor from IBM, SPARC processor from Sun Microsystems, PA-RISC processor from Hewlett-Packard Company, or 68000 series microprocessor from Motorola Corporation. Many other suitable processors, or a specially designed and fabricated processor, may be implemented as PB processor 90. PB processor 90 controls the execution of a program, employed by the present invention, residing in PB logic 96. Furthermore, for convenience of illustration in FIG. 3, PB processor 90, memory 94 and PB logic 96 are shown residing in the power budgeter unit 90. PB processor 90, memory 94 and/or PB logic 96 may reside in alternative convenient locations outside of the power budgeter unit 90, as components of other systems, or as stand alone dedicated elements, without adversely affecting the operation and functionality of the power budgeting system and method. Similarly, power budgeter unit 90 is illustrated as residing outside multiple transceiver unit 62. Power budgeter unit 90 may reside in an alternative convenient location inside the power multiple transceiver unit 62, as a component of other systems, or as a stand alone dedicated unit, without adversely affecting the operation and functionality of the power budgeting system and method. Any such alternative embodiments of a power budgeting system and method are intended to be within the scope of this disclosure and be protected by the accompanying claims.

L. Alternative Embodiments of a Power Budgeter System

Figure 8:
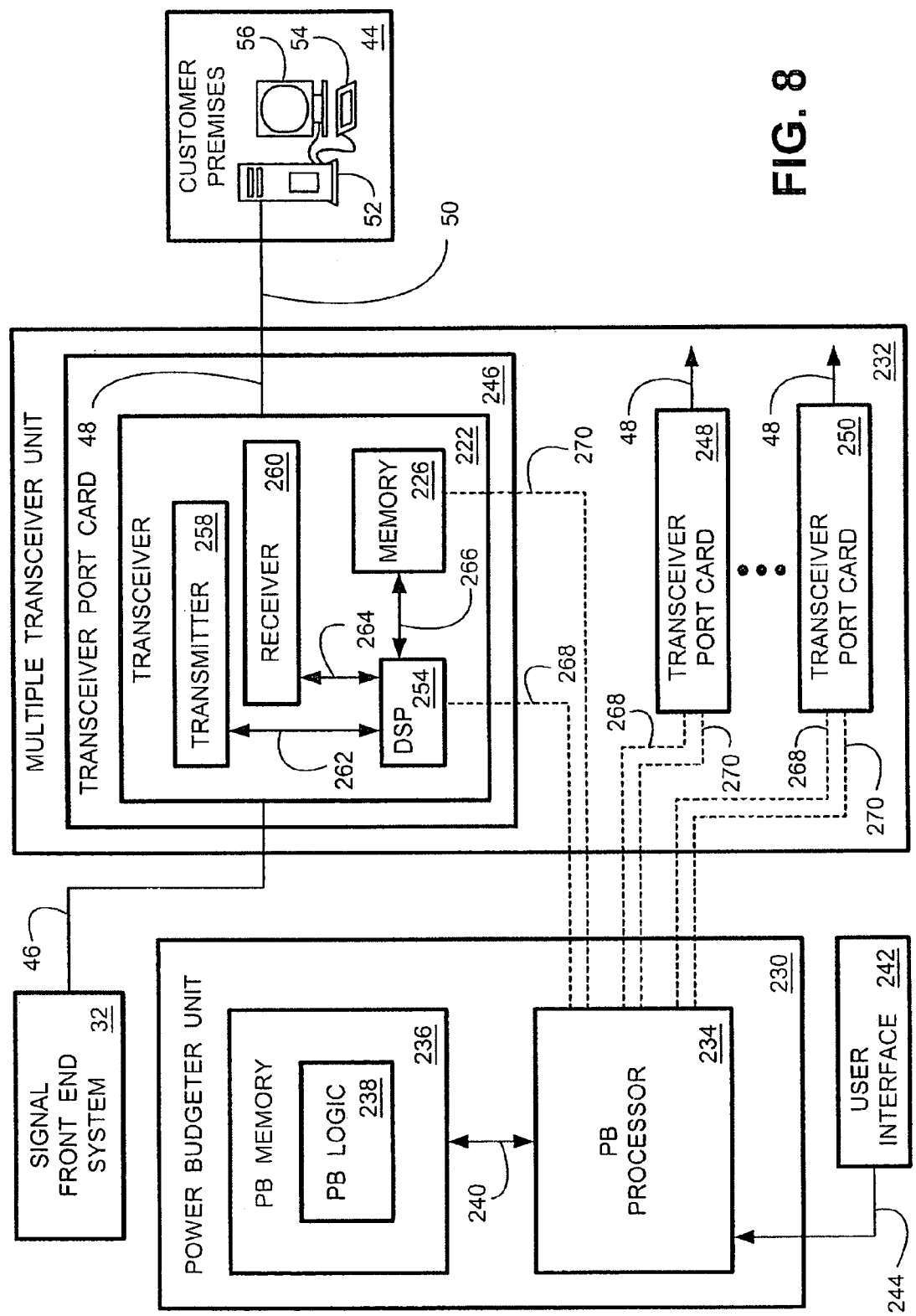
FIG. 8 illustrates an alternative embodiment of the present invention having a power budgeter unit communicating with transceivers residing in multiple transceiver unit of FIG. 2.

FIG. 8 illustrates an alternative embodiment of the present invention having a power budgeter unit 230 communicating with transceivers residing in multiple transceiver unit 232. Similar to the power budgeter unit 90 of FIG. 3, power budgeter unit 230 has a PB processor 234, PB memory 236 and PB logic 238. PB processor 234 communicates with PB memory 236 via connection 240. A user interface 242 is coupled to PB processor 234 via connection 244. Multiple transceiver unit 232 has a plurality of transceiver port cards 246, 248 and 250. A transceiver 252 resides in transceiver port card 246. Transceiver 252 has at least a digital signal processor (DSP) 254, a memory 256, a transmitter 258 and a receiver 260. DSP 254 communicates with transmitter 268 and receiver 260 via connections 262 and 264, respectively. DSP 254 is coupled to memory 256 via connection 266.

Transceiver port cards 248 and 250, and selected other port cards (not shown) residing in multiple transceiver unit 232, are configured and operate similarly to the components residing in transceiver port card 246 described above. However, they do not necessarily need to be identical to each other or to transceiver port card 246.

In this alternative embodiment, PB processor 234 communicates with DSP 254, via connection 268, and with memory 256, via connection 270. Here, PB processor 234 may directly access information stored in memory 256, and may write additional information into memory 256. This alternative embodiment may be particularly desirable for providing complex operating instructions to DSP 254. For example, PB processor 234 may determine that the transmitter 268 is to transmit at a specified data flow rate that receiver 260 is to receive at a different specified data flow rate for the upcoming second. Similarly, PB processor 234 may determine that transmitters and receivers (not shown) residing in transceiver port cards 248 and 250 are to be operating at different data flow rates in the upcoming second. In this situation, it is desirable to store the specified data flow rates locally in each transceiver port card 246, 248, and/or 250.

In the embodiment of the power budgeter unit 90 (FIG. 3), a PB memory 94 was employed in conjunction with memory 112 residing in transceiver 104. In an alternative embodiment, a single memory residing in a convenient location is utilized for each transceiver rather than two separate memories. Such an alternative embodiment may be particularly suitable in applications where the DSP in an existing transceiver unit is to be upgraded to operate with a power budgeter unit, and where the existing memory residing on the transceiver port card is not adequate and/or is not appropriately configured to store the necessary data flow rate information for the monitored time period. Another alternative embodiment of the power budgeter unit 90 may employ only a single memory for all transceivers, such as the PB memory 94, which is configured to receive and store data flow rate information from the plurality of digital signal processors that are coupled to the PB processor 92. Such an alternative embodiment may be particularly desirable in applications where PB processor 92 is to have access to the stored data over longer periods of time.

As illustrated in FIG. 3, a single power budgeter 90 is in communication with one multiple transceiver unit 66. In an alternative embodiment, a single power budgeter unit may be controlling transceivers residing in a plurality of multiple transceiver units. With this alternative embodiment, the power budgeter unit would have stored in the PB memory a unique threshold that has been specified for each of the multiple transceiver units controlled by the power budgeter unit. This alternative embodiment may be particularly desirable in an installation where limited space in the central office and/or inside the multiple transceiver units prevents the installation of individual power budgeter units. Furthermore, this alternative embodiment of a power budgeter unit may be more cost effective in installations having a large number of multiple transceiver units that are to be controlled by a power budgeter.

In the preferred embodiment described above, a one second time period was monitored. In alternative embodiments of the power budgeter unit, the monitored time period may be equal to any other convenient and suitable time period. For example, but not limited to, it may be desirable to monitor data flow in time increments of a half-second. Furthermore, in another alternative embodiment, the time period may be adjustable. An adjustable time period may be particularly applicable when the power budgeter unit is monitoring transceivers where transceiver activity varies widely. In this alternative embodiment, during times when aggregate transmitter activity is low, relatively long time periods are monitored. Then, during times when aggregate transmitter activity is high (and approaching the thresholds), relatively shorter time periods are monitored to achieve greater control and flexibility over the transceiver data flow rates. For example, it may be desirable to monitor data flow during periods of low transceiver activity once every five seconds, and then monitor data flow once every second during periods of high transceiver activity.

The preferred embodiment described above is configured to operate in a communication system where a single transceiver is connected to a single device residing at customer premises. An alternative embodiment of the power budgeter unit 90 is configured to operate in a digital communication system that is configured such that a single transceiver is communicating with a plurality of devices residing in one or more customer premises. Such a system is referred to hereinafter as a multi-point communication system. In the multi-point communication system, the various communication signals are combined into a single stream of packetized data information that is transmitted to the plurality of devices residing in the one or more customer premises. One example of such a communication system employs time division multiplexing of the individual communication signals into a single stream of packetized data. The power budgeter unit embodiment configured to operate on a multi-point system would allocate data flow restrictions to the transceiver in such a manner that the overall data transmit and receive rates to the individual devices residing in the one or more customer premises would not be degraded to a level that is unacceptable by the customers. That is, the power budgeter unit would assign the restriction credits to the transceiver so that the restrictions are fairly applied to all customers. Thus, the transceivers would be turned off at appropriate times during the transmission of the packetized data flow stream so that all customers share fairly in the data flow restriction applied by the power budgeter unit.

Alternative embodiments of a power budgeter unit configured to operate with a multi-point communication system may allocate restrictions to different customers based on appropriate quality of service guidelines. For example, premium service customers may be subjected to fewer data flow restrictions than other customers. Conversely, budget or economy customers may receive a greater degree of data flow restrictions. One skilled in the art will appreciate that many variations and modifications may be made to the above-described power budgeter unit configured to operate on a multi-point communication system without departing substantially from the spirit and principles of the power budgeting invention. All such modifications and variations are intended to be included within the scope of this disclosure and to be protected by the claims for the power budgeting invention.

In the preferred embodiment, inactive transceivers are allowed to turn on and transmit/receive data without any restrictions. Only during the next second is the newly active transceiver subject to limitations. In an alternative embodiment, the power budgeter, during time when transceiver activity is limited, may impose a start-up limitation on the inactive transceivers. For example, the power budgeter may impose a 50% data flow rate limit on the inactive transceivers. With this alternative embodiment, when an inactive transceiver becomes active, the additional heat dissipation burden introduced by the newly active transceiver on the already limited system will be mitigated.

In the preferred embodiment, the power budgeter unit 90 (FIG. 3) turned off transceivers, transmitters and/or receivers to impose data flow restrictions. In an alternative embodiment, a power budgeter unit orders transceivers, transmitters and/or receivers into a low power state, such as, but not limited to, an idle state or power conservation mode. Furthermore, in another alternative embodiment, a power budgeter unit orders associated components residing in a transceiver into an off state, idle state and/or low power mode.

The above-described embodiments of a power budgeter unit are illustrated and described in the context of a TDM DSL communications network. However, the concepts and principles of the power budgeter unit are equally applicable to TDM versions of ADSL, RADSL, VDSL or a combination of systems having segments employing different formats for each segment. Any such alternative embodiments of a transmitter power manager employed in a communication system employing other communication formats is intended to be within the scope of this disclosure and to be protected by the accompanying claims for the power budgeter unit.

The embodiments described above have been generally described in reference to a communication system employing subscriber loops. An alternative embodiment present invention is configured to operate in other types of communication systems. For example, but not limited to, elements residing in a mobile wireless communication system transceiver (transmitter and/or receiver) may be selected for powering down during times of transmitter inactivity, and/or may be powered down during times of receiver inactivity. Examples of communication signals employed in wireless systems that could utilize the present invention include, but are not limited to, IS-136, time division multiple access (TDMA) and code division multiple access (CDMA).

It should be emphasized that the above-described "embodiments" of the power budgeter unit, particularly, any "preferred" embodiments, are merely possible examples of implementations, merely set forth for a clear understanding of the principles of the power budgeter unit. Many variations and modifications may be made to the above-described embodiment(s) of the power budgeter unit without departing substantially from the spirit and principles of the power budgeter unit. All such modifications and variations are intended to be included herein within the scope of the power budgeter unit, and be protected by the claims that follow.

The invention claimed is:

1. A system for controlling power in a communication system, comprising:
    a transceiver that communicates data;
    a digital signal processor (DSP) configured to monitor data flow through the transceiver during a predefined first time period; and
    a processor unit coupled to the DSP and configured to compare the total data flow through the transceiver during the first time period with a predefined threshold, the processor unit further configured to generate a control signal, such that when the total data flow monitored by the processor unit during the first time period exceeds the threshold, the processor unit generates the control signal such that data flow through the transceiver is reduced for a portion of a predefined second time period so that the average of the data flow through the transceiver during the first time period and the second time period is less than the predefined threshold.

2. The system of claim 1, wherein the processor unit further comprises:
    a processor;
    a memory coupled to the processor; and
    a logic module residing in the memory and executed by the processor, the logic module configured to compare the threshold with the total data flow through the transceiver during the first time period, and further configured to allocate the difference between the threshold and data flow through the transceiver during the first time period so that the average of the data flow through the transceiver during the first time period and the second time period is less than the predefined threshold.

3. The system of claim 1, wherein the transceiver, DSP and processor unit reside in a processing system.

4. The system of claim 3, wherein the processing system resides at a customer's premise.

5. The system of claim 3, wherein the transceiver processor is further configured to power down a transmitter and a receiver residing in the transceiver to effect a slow down in a data flow through the transceiver.

6. The system of claim 1, further comprising a user interface coupled to the means for controlling and configured so that a user may specify the predefined time period and the predefined threshold.

7. A system for controlling power in a communication system, comprising:
    at least one transceiver configured to transmit and receive communication signals;
    at least one means for counting configured to monitor data flow through the transceiver during a predefined first time period; and
    a means for controlling coupled to the means for counting and configured to compare the total data flow through the transceiver during the first time period with a predefined threshold, the processor unit further configured to generate a control signal,
    such that when the total data flow monitored by the means for controlling during the first time period exceeds the threshold, the means for controlling generates the control signal such that data flow through the transceiver is reduced for a portion of a predefined second time period so that the average of the data flow through the transceiver during the first time period and the second time period is less than the predefined threshold.

8. The system of claim 7, wherein the transceiver further comprises:
    a transmitter configured to transmit a communication signal;
    a receiver configured to receive a communication signal; and
    a transceiver processor coupled to the means for controlling, the transmitter, the receiver and the means for counting, and further configured to receive the control signal from the means for controlling and generate a transmitter control signal so that data flow through the transmitter residing in the transceiver is reduced during the second time period, and further configured to generate a receiver control signal so that data flow through the receiver residing in the transceiver is reduced during the second time period.

9. The system of claim 7, further comprising a user interface coupled to the means for controlling and configured so that a user may specify the predefined time period and the predefined threshold.

10. The system of claim 7, wherein the transceiver is a modem that resides at a customer's premise.

11. A method for controlling data flow in a communication system, the method comprising the steps of:
    monitoring data flow through a transceiver for a predefined first time period;
    determining the total data flow through the transceiver during the first time period;
    comparing the total data flow to a predefined threshold; and
    reducing data flow through the transceiver for a predefined second time period so that the average of the data flow through the transceiver during the first time period and the second time period is less than the predefined threshold.

12. The method of claim 11, further comprising the steps of:

determining a difference between the total data flow through the transceiver during the first time period and the threshold; and reducing the data flow by the difference during the second time period.

13. The method of claim 11, further comprising the step of associating the predefined threshold with a specified total amount of heat to be dissipated by the transceiver during the first time period so that when the total data flow through the transceiver equals the predefined threshold the total amount of heat dissipated substantially equals the specified total amount of heat.

14. The method of claim 11, further comprising the step of specifying the first period and the second period.

15. The method of claim 11, further comprising the step of specifying the threshold.

16. The method of claim 11, further comprising the step of turning off the transceiver for a specified portion of the second time period such that data flow through the transceiver is reduced during the second time period.

17. The method of claim 16, further comprising the step of turning off a transmitters residing in the transceiver for a specified portion of the second time period such that data flow through the transceiver is reduced during the second time period.

18. The method of claim 11, further comprising the step of operating the transceiver in a low-power idle state for a specified portion of the second time period such that data flow through the transceiver is reduced during the second time period.

19. A system for controlling data flow in a communication system, comprising:

means for monitoring data flow through a transceiver for a predefined first time period;

means for determining the total data flow through the transceiver during the first time period;

means for comparing the total data flow to a predefined threshold; and means for reducing data flow through the transceiver for a predefined second time period so that the average of the data flow through the transceiver during the first time period and the second time period is less than the predefined threshold.

20. The system of claim 19, further comprising means for turning off a transmitter residing in the transceiver for a specified portion of the second time period such that data flow through the transmitter is reduced during the second time period.

21. A computer readable medium having a program for controlling data flow in a communication system, the program comprising logic configured to perform the steps of:

receiving information corresponding to the total data flow through a transceiver during a predefined first time period;

comparing the total data flow to a predefined threshold; and determining a control signal such that data flow through the transceiver for a predefined second time period is reduced so that the average of the data flow through the transceiver during the first time period and the second time period is less than the predefined threshold.

* * * * *

UNITED STATES PATENT AND TRADEMARK OFFICE
CERTIFICATE OF CORRECTION

PATENT NO. : 7,558,203 B2  
APPLICATION NO. : 11/052317  
DATED : July 7, 2009  
INVENTOR(S) : Bob Scott Page 1 of 2

It is certified that error appears in the above-identified patent and that said Letters Patent is hereby corrected as shown below:

In Drawing, FIGS. 2, 3, and 8, the Signal Front End System reference numeral "32" should read --28--.

In Drawing, FIG 2, the Power Budgeter Unit reference numeral "62" should read --61--.

In Drawing, FIG. 7, the reference numeral "128" should read --218--.

In Drawing, FIG. 8, the Transceiver reference numeral "222" should read --252-- and the Memory reference numeral "226" should read --256--.

In column 2, line 36: the text "central office (CO) 22 coupled" should read --central office (CO) 22 is coupled--.

In column 6, lines 44, 55, 67 and column 7, lines 4, 34, 37: the reference numeral "62" should read --61--.

In column 6, line 60: the text "multiple transceiver unit 62" should read --multiple transceiver unit 64--.

In column 7, lines 48, 53, 55: the reference numeral "60" should read --90--.

In column 7, line 49 and column 18, lines 12, 21, 24, 25: the text "PB processor 90" should read --PB processor 92--.

In column 7, line 67: the text "front end system 32" should read --front end system 28--.

In column 10, line 15: the reference numerals "124-126" should read --124-146--.

In column 12, line 18: the text "transceiver port cards 66" should read --transceiver port card 66--.

Signed and Sealed this  
Thirteenth Day of September, 2011

David J. Kappos  
*Director of the United States Patent and Trademark Office*

CERTIFICATE OF CORRECTION (continued)
U.S. Pat. No. 7,558,203 B2

In column 12, line 26: the text "six symbol periods are shown" should read --six symbol periods 148-158 (and 172-182 of FIG. 6) are shown--.

In column 12, line 33: the text "period (162, 166, 170). A customer" should read --period (162, 166, 170) while symbol periods 160, 164, and 168 are active. A customer--.

In column 13, line 66 and column 14, line 7: the reference numeral "69" should read --96--.

In column 15, line 35: the text "The process starts at block 212" should read --The process starts at block 202--.

In column 15, line 38: the text "shown in block 202" should read --shown in block 204--.

In column 8, lines 40-42, 44, 64-65; column 8, line 67 - column 9, line 1; column 17, line 63; column 18, lines 4, 7; and column 19, line 33: the text "multiple transceiver unit 66" should read --multiple transceiver unit 62--.

In column 18, line 54 and column 19, line 4: the text "transmitter 268" should read --transmitter 258--.